UNITED STATES PATENT OFFICE.

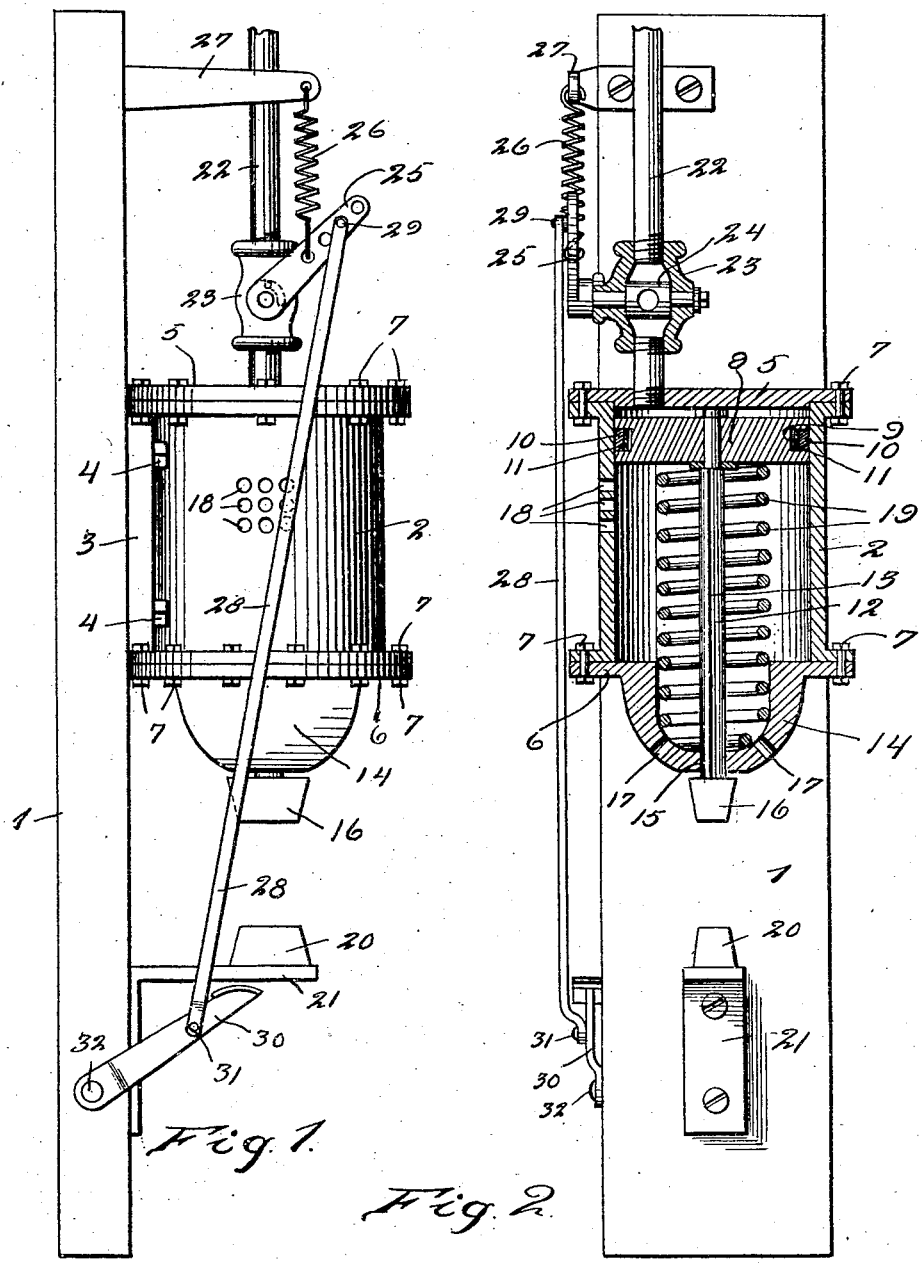

ISAAC W. TOWNSEND, OF TEAGUE, TEXAS.

PNEUMATIC TOOL.

1,062,749. Specification of Letters Patent. Patented May 27, 1913.

Application filed July 11, 1912. Serial No. 708,765.

*To all whom it may concern:*

Be it known that I, ISAAC W. TOWNSEND, a citizen of the United States, residing at Teague, State of Texas, have invented certain new and useful Improvements in Pneumatic Tools, of which the following is a specification.

The present invention relates to an automatic tool of the type wherein a reciprocatory element is employed to do the work, and has particular reference to a device of this character so constructed that the ordinary shifting valve which is employed to alternately introduce pressure into opposite ends of the cylinder is dispensed with, and, such pressure is continually introduced into one end only of the cylinder.

An important object of the invention is to provide a device of the above mentioned character, which is capable of operating automatically at a very high speed.

A further object of this invention is to provide a device of the above mentioned character, which is simple in construction, cheap to manufacture, strong, durable, and reliable in operation.

Other objects and advantages of my invention will be apparent during the course of the following description.

In the accompanying drawings forming a part of this specification and in which like numerals are employed to designate like parts throughout the same, Figure 1 is a side view of the device, and, Fig. 2 is a front view of the same, parts thereof being shown in section.

In the drawings, wherein is illustrated a preferred embodiment of my invention, the numeral 1 designates a preferably upstanding stationary support, upon which is rigidly mounted an upstanding cylinder 2. This cylinder is formed upon a side plate 3, which is attached to the support 1 by bolts 4 or the like. The ends of the cylinder 2 are closed by upper and lower heads 5 and 6, which are held in place by bolts 7.

Mounted to reciprocate within the upper portion of the cylinder 2 is a piston 8, provided with an annular groove 9 to receive a packing ring 10, which may be formed of rubber, or leather. The packing ring 10 is urged outwardly into proper engagement with the inner wall of the cylinder 2 by means of a split annular spring 11. Rigidly connected with the piston 8 is a depending rod or reciprocatory element 12, provided with a longitudinally extending groove 13. The lower head 6 includes a depending hollow extension or cup-shaped portion 14, having an opening 15 formed therethrough, through which the rod 12 passes. A portion of the wall of the opening 15 is in the form of a spline or key (not shown), which fits within the groove 13 to positively prevent the rod 12 from turning upon its longitudinal axis with relation to the cylinder 2 but allowing it to move freely longitudinally. Detachably connected with the lower end of the rod 12 outwardly of the cup-shaped portion 14, is a hammer head 16 or other tool. The cup-shaped portion 14 is provided with a suitable number of openings 17, to allow of the free passage of air into and out of the lower portion of the cylinder 2, when the piston 8 is operating.

The cylinder 2 is provided near and suitably spaced from the upper end thereof with a plurality of longitudinally extending sets of relatively small exhaust openings 18. This is an important feature of the invention, as I have found from practical tests that the device will not satisfactorily operate with a single large exhaust opening, while highly satisfactory results are obtainable by the employment of the plurality of longitudinal sets of relatively small exhaust openings.

In order that the device may operate properly it is necessary that a comparatively large and stiff freely acting coiled spring 19 be employed to return the piston 8 to its starting position. The turns of the compressible and expansible coiled spring 19 are much larger in diameter than the rod 12, for which reason the rod 12 can not hold the spring in its proper position. To overcome this disadvantage I have provided the depending cup-shaped portion 14 on the head 6, within which cup-shaped portion the lower end of the spring 19 snugly fits and is held thereby in its proper position, as shown.

Disposed below and in coöperative relation to the hammer head 16 is an anvil 20 or the like, mounted upon the stationary bracket 21.

Leading into the upper end of the cylinder 2 through the head 5 is a pressure supply pipe 22, having connection with a source of steam pressure or compressed air. A valve structure is connected in the pipe 22, comprising a casing 23 and a pivoted valve 24, adapted to assume positions to control the supply of pressure to the cylinder 2. The valve 24 is moved by a swinging arm 25, connected with a retractile coil spring 26, having its upper end connected with a stationary bracket 27. The spring 26 normally holds lever 25 in its uppermost position to maintain the valve 24 in its closed position for cutting off the supply of pressure to the cylinder 2. The lever 25 is moved downwardly for opening the valve 24, by a rod 28, pivotally connected therewith, as shown at 29. This rod extends downwardly and is pivotally connected with a treadle or swinging lever 30, as shown at 31. The treadle or lever 30 is pivotally connected with the support 1, as shown at 32.

The operation of the device is as follows. The lever 30 is depressed whereby the rod 28 is moved downwardly to swing lever 25 to move the valve 24 to its open position. The lever 30 is retained in its depressed position as long as the device is operated and is automatically returned to its upper position by spring 26. At which time the valve 24 is also moved to its closed position. Assuming the pressure, either steam or compressed air, is being continuously fed through pipe 22 into the upper end of the cylinder 2, the piston 8 will be quickly driven downwardly until the same passes the longitudinal sets of exhaust openings 18. The pressure is now exhausted through the openings 18, whereby the spring 19 will return the piston 8 to its starting position, to be again forced downwardly by the pressure continuously supplied to the upper end of the cylinder 2. The work is of course placed upon the anvil 20 so that it may be struck by the hammer head 16 or other tool.

Although I have described my invention in the embodiment of a reciprocatory hammer operated by either compressed air or steam, yet the principle of the invention is not restricted to this form of tool alone, as it may be carried out in various other more or less similar tools, such as drills, riveters or the like. It is also to be understood that the form of my invention herewith shown and described, is to be taken as a preferred example of the same, and that certain changes in the shape, size, and arrangement of parts may be resorted to without departing from the spirit of the invention as set forth in the sub-joined claims.

Having thus described my invention, I claim:—

1. In a device of the character described, a cylinder, a pressure inlet pipe leading into the cylinder, said cylinder being provided between its ends with a plurality of spaced exhaust ports which are arranged to form a longitudinal row of the same with relation to the cylinder, a piston mounted to operate within the cylinder, a rod connected with the piston, a suitably stiff coil spring surrounding the rod to oppose the movement of the piston in one direction, and an element connected with the free end of the rod.

2. In a device of the character described, a cylinder provided between its ends with a plurality of spaced relatively small exhaust ports which are arranged in a row extending longitudinally of the cylinder, a pressure supply pipe leading into one end of the cylinder, a piston mounted to reciprocate within the cylinder, a piston rod connected with the piston, a head connected with the opposite end of the cylinder and provided with an opening for the passage of the piston rod and having a relatively large pocket formed therein, a relatively large stiff coil spring surrounding the piston rod and engaging the piston and having its turns of such large diameter that the same are spaced away from the piston rod and are the proper size to fit snugly within the relatively large pocket whereby the spring is held against displacement, and an element connected with the free end of the piston rod.

In testimony whereof I affix my signature in presence of two witnesses.

ISAAC W. TOWNSEND.

Witnesses:
 HARRY HARSON,
 PETER COFFENBERG.